US007332665B2

(12) United States Patent
Haney

(10) Patent No.: US 7,332,665 B2
(45) Date of Patent: Feb. 19, 2008

(54) SLIDE RULE DEVICES FOR MUSIC STUDY

(76) Inventor: Bruce Frederick Haney, 121 Foxport Rd., Kingsport, TN (US) 37664

( * ) Notice: Subject to any disclaimer, the term of this patent is extended or adjusted under 35 U.S.C. 154(b) by 0 days.

(21) Appl. No.: 11/133,601

(22) Filed: May 20, 2005

(65) Prior Publication Data

US 2006/0000342 A1 Jan. 5, 2006

Related U.S. Application Data

(60) Provisional application No. 60/579,799, filed on Jun. 15, 2004.

(51) Int. Cl.
G09B 15/00 (2006.01)
(52) U.S. Cl. .................................. 84/470 R
(58) Field of Classification Search ............. 84/470 R, 84/474, 472, 473, 475, 471 SR, 485 SR, 84/485 R
See application file for complete search history.

(56) References Cited

U.S. PATENT DOCUMENTS

| | | | | |
|---|---|---|---|---|
| 5,029,507 A | * | 7/1991 | Bezeau, Jr. | ............ 84/485 SR |
| 5,386,757 A | * | 2/1995 | Derrick | ....................... 84/473 |
| 6,969,793 B2 | * | 11/2005 | Kerkhoff | ..................... 84/478 |

* cited by examiner

Primary Examiner—Kimberly Lockett

(74) Attorney, Agent, or Firm—Mark Davis

(57) ABSTRACT

Slide-rule type devices for music study. Requires two printed parts that slide relative to each other; or three parts in the special case of a device for studying violin. Information on one of the parts is viewed through the other part. When employed together, the two parts reveal information most relevant in a particular musical scale or key, and obscure the information not normally used in that key. Multiple embodiments are possible, allowing a device to be constructed specific to a given instrument such as a violin or guitar, but the concept is not limited to stringed instruments, or any instrument. Similar devices could be made to facilitate music study for voice students, songwriters and arrangers. One of the sliding pieces is printed with all the available notes or tones, say, in the range of an instrument like a guitar. In the most likely embodiment, the other piece contains a transparent window printed with a series of geometric shapes of varying colors. These shapes are arranged in a pattern consistent with the scale type being studied and can be mapped to correspond to the layout on an instrument. They are colored such that a tone in a particular scale position is always in a particular color. The parts are indexed such that they can be aligned to show useful information in any key, including but not limited to all the possible voicings of the tonic chord, the most commonly used chords in that key, and chord variations that are based upon the major chord triad. This invention facilitates learning of simple music theory and the application of that theory to an instrument of choice. It is simple to use, easy to understand, and different in many respects from other such devices in the prior art, as will be discussed in the specification.

4 Claims, 7 Drawing Sheets

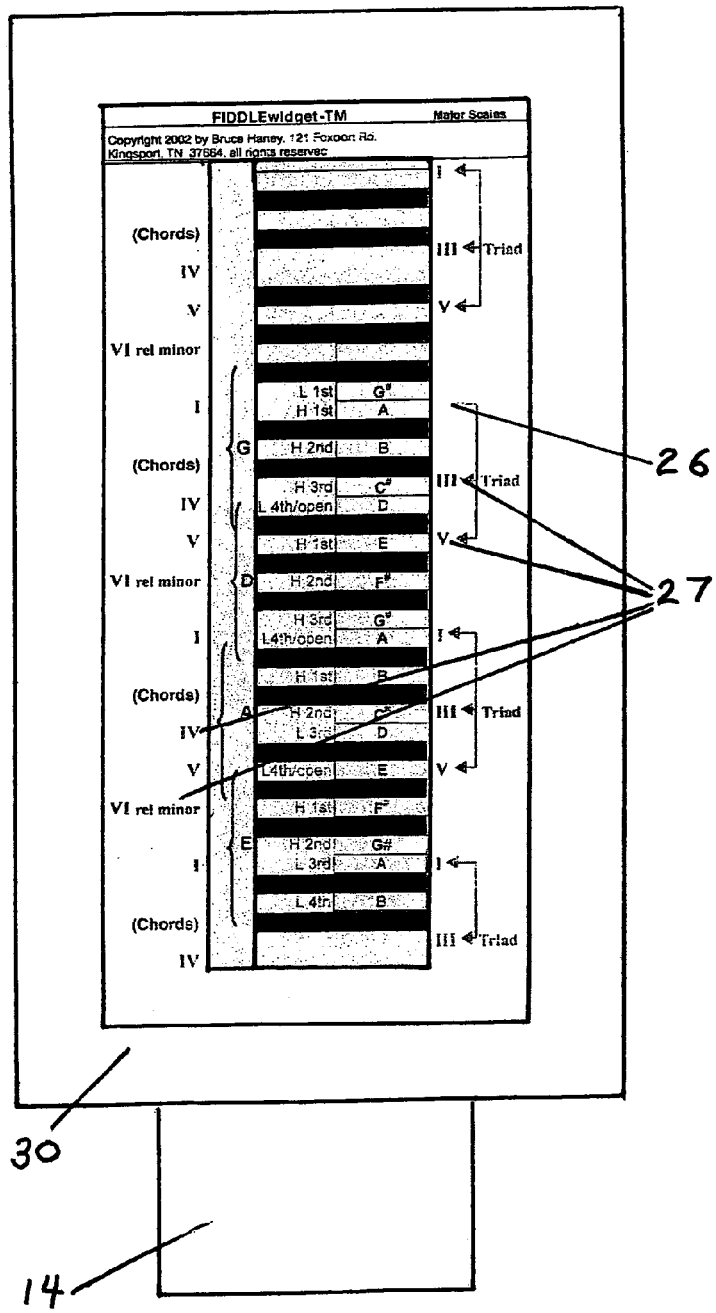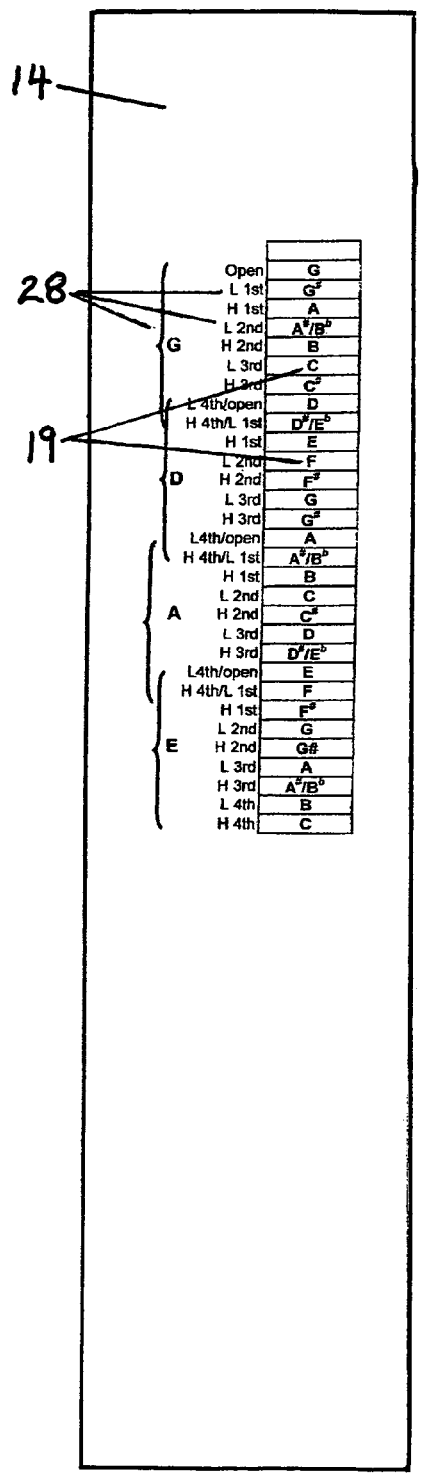

SLIDE RULE DEVICES FOR MUSIC STUDY

This application is based on Provisional Application 60/579,799, filed on Jun. 15, 2004. The internal priority date for this patent should be the earliest date allowable by that Provisional Application.

I have invented a slide-rule type device that makes it easy for a music student to relate the theoretical major scale structure to his or her instrument. The basic device is constructed to include two printed parts that move relative to each other; one being movable and the other fixed. Any other parts are required only to hold these two pieces together and align them properly. These will not require any detailed discussion. All pieces except for a printed transparent window can be made from heavy paper or posterboard type material, or any similar flat, printable material with sufficient durability.

One of the two major parts, either fixed sliding, is printed with the notes or tones that can be played on the instrument in chromatic sequence. These can be arrayed in a single line with information regarding their location on the instrument printed next to them, or, in the case of a stringed instrument with multiple strings, in an array of notes matching the tones available on the properly tuned instrument, such as a guitar or mandolin.

The other part contains a transparent area (I used a printable plastic film) printed with an array of circles, rectangles or other symbols corresponding to the major scale whole step/half step pattern and matching the geometry (either a continuous line or a more complex array) of the other part with which it is to be aligned. The printing is done using a transparent ink so the notes array on the first part can be read through the inked symbols of the second part if the note name is placed directly below the inked symbol. The two parts are indexed in such a way that the user can set the device on the tonic note of the scale he or she is working in, and see the notes of that scale and where to find them on the instrument. The note array on one part is aligned with the inked symbols on the other part so the scale or key being studied is displayed in the transparent and colored symbols only. Notes that are not in that scale are obscured by the gray symbols so that the student is not overwhelmed with information that is not necessary to play in that key.

The major scale relationship is critically important in American and European music, and finding chords and harmonics in these scales is a confusing counting activity. It is a goal of this invention to provide the student a way to quickly identify what notes to look for, what notes to exclude, and find their location immediately, anywhere on the instrument. Musical instruction slide rules have been discussed in the past; several have been patented and a few produced commercially.

U.S. Pat. No. 6,323,410 B1 (Rackow) discloses a slide rule device mainly for teaching music theory and is not applicable to a particular instrument. It has a reversible template, one side being used for the sharped keys, and the other side for flatted keys.

U.S. Pat. No. 5,866,832 (Solowiow) describes a device to aid in the sight reading of musical scores.

U.S. Pat. No. 5,386,757 (Derrick) depicts a slide-rule device for fretted stringed musical instruments. It employs multiple interchangeable sliding parts and uses a color coding system to differentiate the finger of the hand used to play the note. My devices are not limited to fretted or even to stringed instruments, and typically require only one sliding piece (two in the case of the violin if studying higher positions). They use minimal color to establish a note's relative position in the major scale, not the finger used to play it. Finger selection may vary depending on the student's dexterity and the context of where a note or chord occurs in the music. Available notes on the instrument never change locations, so this is what my device focuses on.

U.S. Pat. No. 5,644,096 (Bull) is another slide-rule device applicable to the guitar but could be expanded to other stringed instruments. It uses a numbering system rather than colors to establish scale position and is a good deal more complex than the invention I propose, bearing little resemblance to it.

Other devices have been patented, and a few produced commercially, which function in an empirical sort of way, such that a rule or wheel is set to a tonic note and a drawing of a guitar chord is displayed in a window.

My invention differs from these in several respects.

I am proposing a simple device to be used by thousands of beginning to intermediate level music students, not just the relatively small number of highly knowledgeable music teachers and professional musicians. It focuses primarily on the major keys that comprise the majority of American and European (Western) music. It will allow conversion to find relative minor chords as well as other chord forms but does not complicate the issue beyond the typical student's capability. It is based on real music theory, and is simple enough for the student to see and understand how these devices work. This allows the student to begin to learn some scale and chord theory without realizing that it is happening.

I am enclosing nine illustrations on six drawing sheets.

Figure 4:
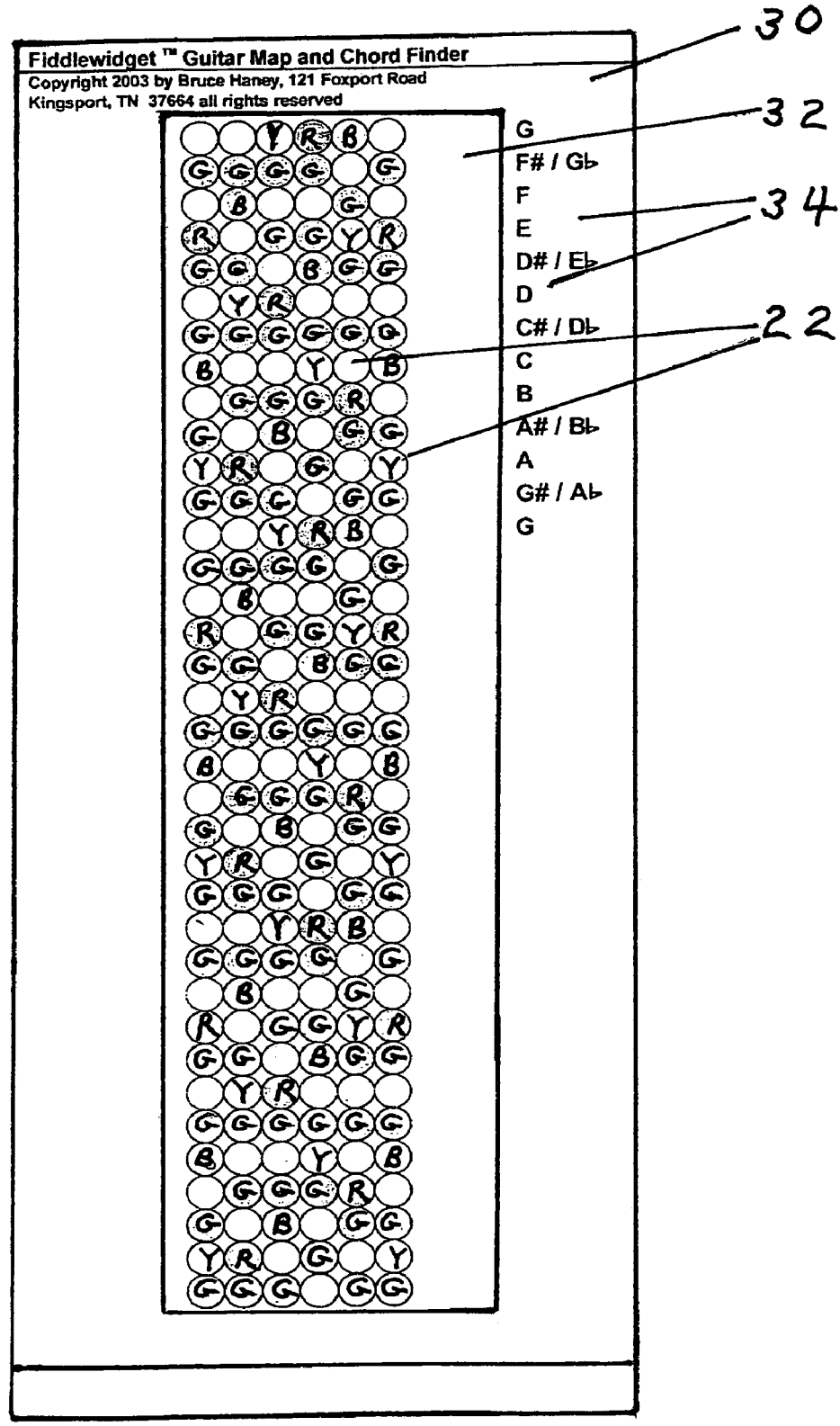

FIG. 4 is a scanned image of the front of an actual device, showing the printed window mounted in the frame. Some lines were reinforced for clarity, and labels were inked over the circles to indicate their color. Colors in the actual device are transparent, (no label) Gray (G), Red (R), Blue (B) and Yellow (Y). This assembly forms the front of the device.

Figure 5:
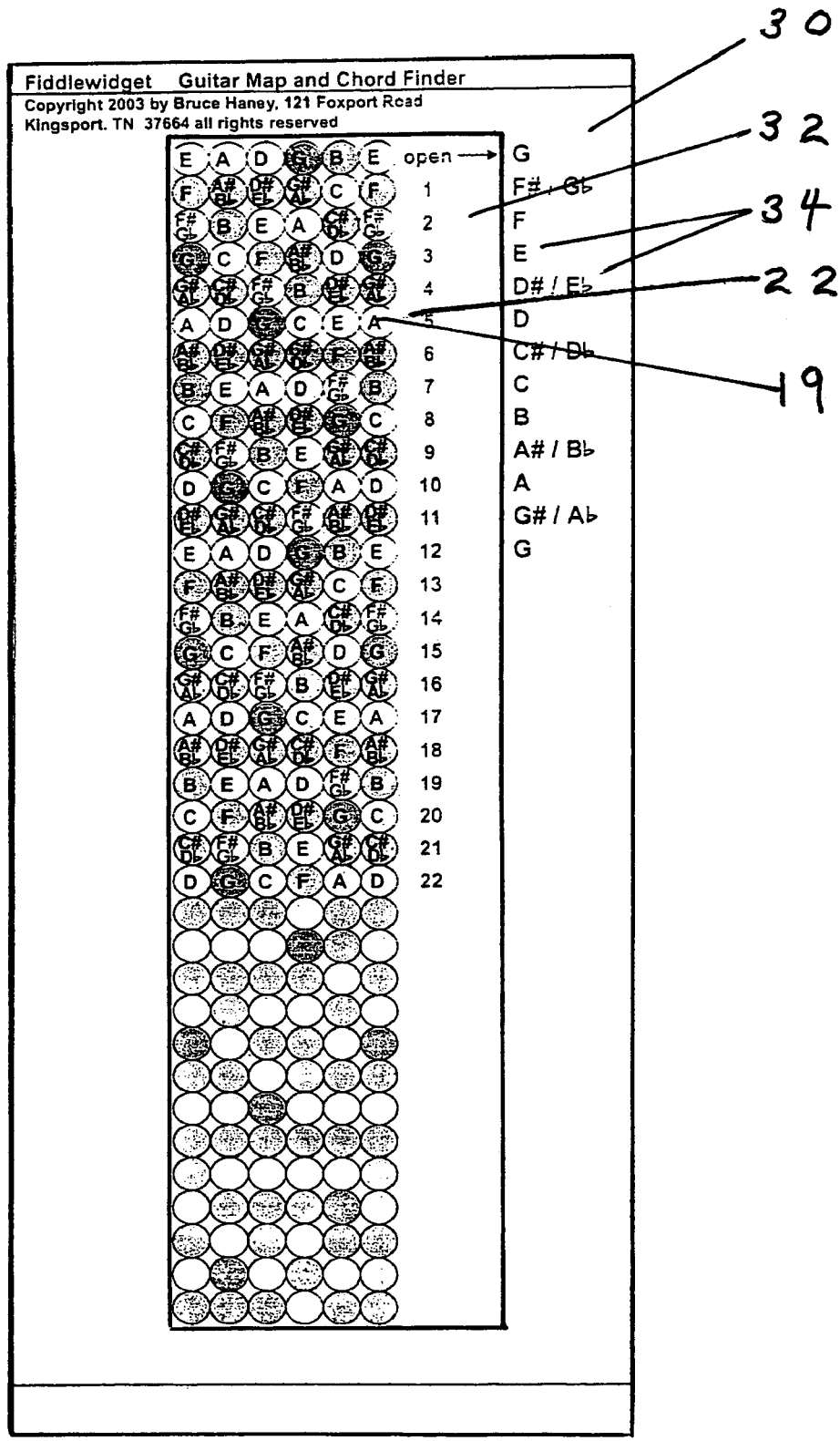

FIG. 5 is a scanned picture of the completed guitar device, with the slide inserted, set to display the key of G major. All notes in the scale are displayed in either transparent or colored circles. Notes that are not in this key or scale are in Gray circles.

Figure 6A:
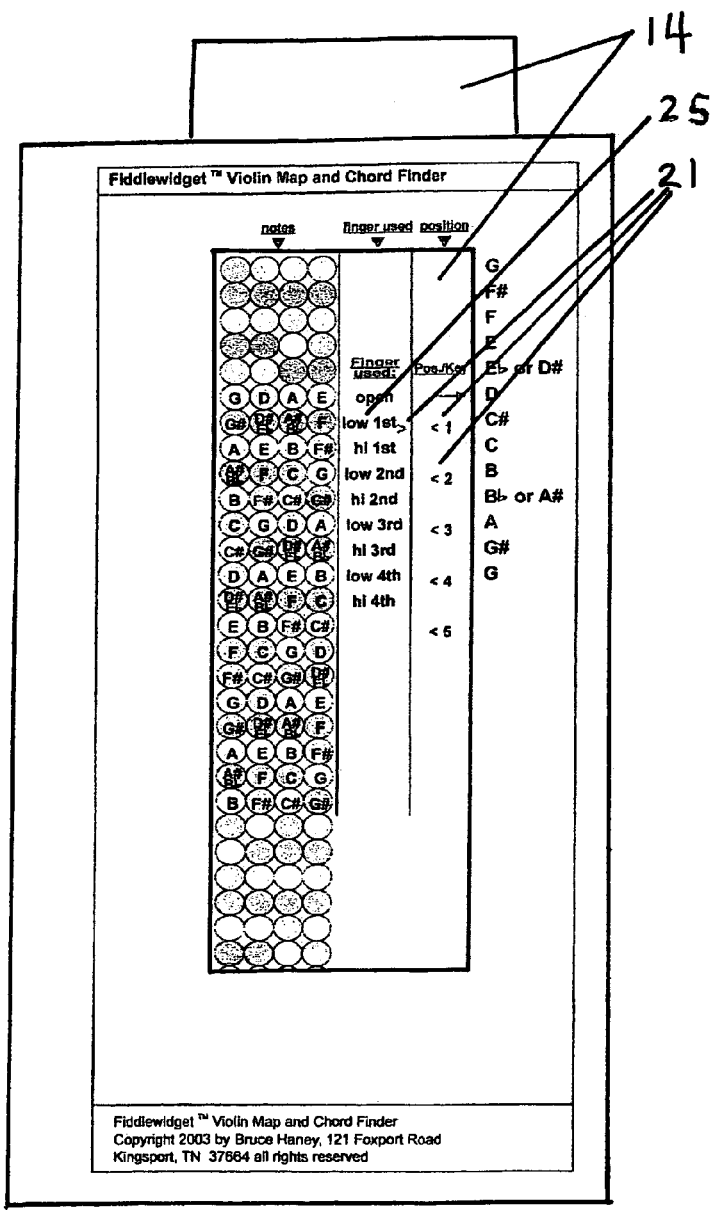

FIG. 6A is a scanned front view image of a similar device I constructed for the fiddle or violin, which differs from the guitar tool in that the fiddle is a fretless instrument, so there are no fret markings on the slide 14. Fret numbers have been replaced by "fingers" indicators 25, and a column of violin "positions" indicators 21 was added on the right hand edge of this slide. The slide has been aligned in this case to display the key of D major.

Figure 6B:
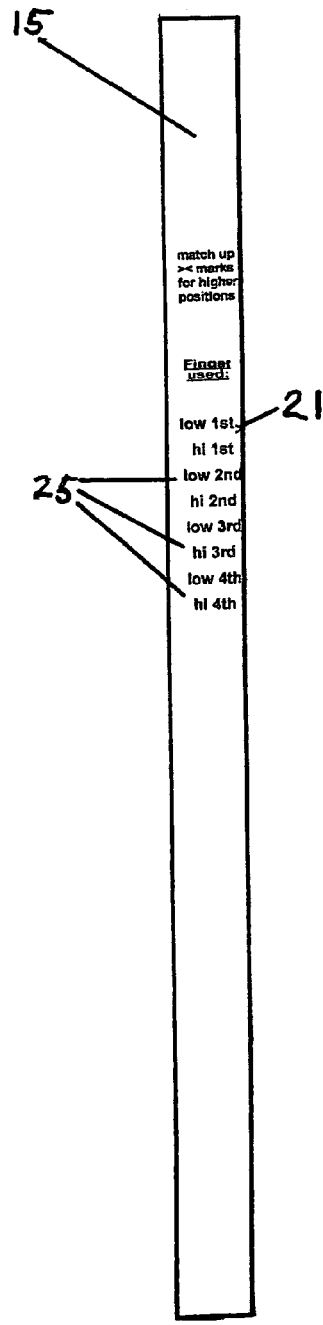

Additionally, there is a small secondary slide 15 shown in FIG. 6B, which allows the student to mimic the movement up to the higher positions, where the violinist slides the hand up the neck of the instrument.

FIG. 7A is a scanned front view of yet another device I constructed, also for the fiddle, that could be applied to almost any instrument, whether stringed or not. The slide for this device is shown in FIG. 7B. The notes on the slide in FIG. 7B are shown in a continuous chromatic line, with information regarding their location on the instrument printed next to them. This device uses the same half-step/whole step major scale pattern as the other devices and could be easily modified to produce a teaching device for a trombone, flute, or any other instrument, as long as a note in a scale can be related to a position or fingering pattern on the instrument.

Figure 1:
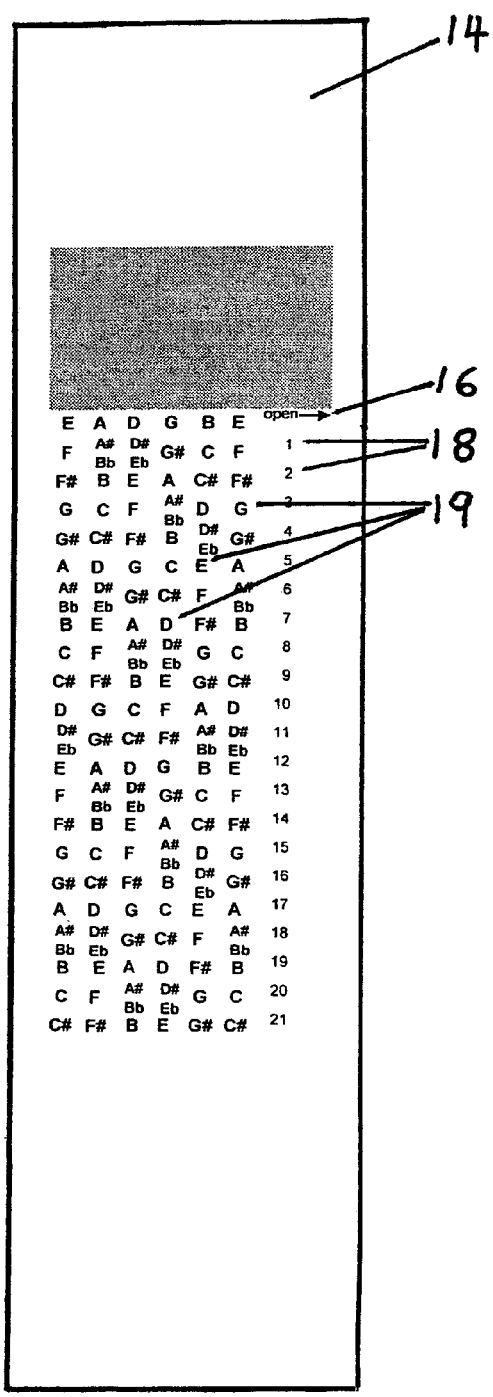
FIG. 1 is a front view of the slide for a teaching device for a multiple-stringed instrument, a guitar in this case.
Figure 2:
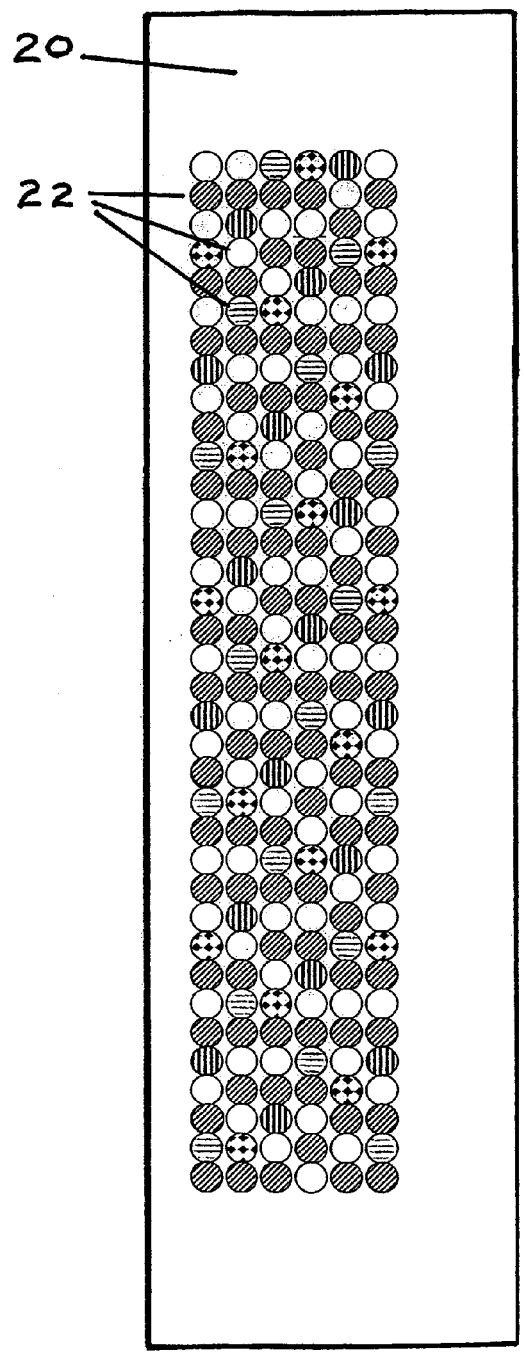
FIG. 2 is a front view of the printed window for the guitar device. Colors are differentiated by fill patterns in the circles, to conform to USPTO requirements for black and white drawings.
Figure 3:
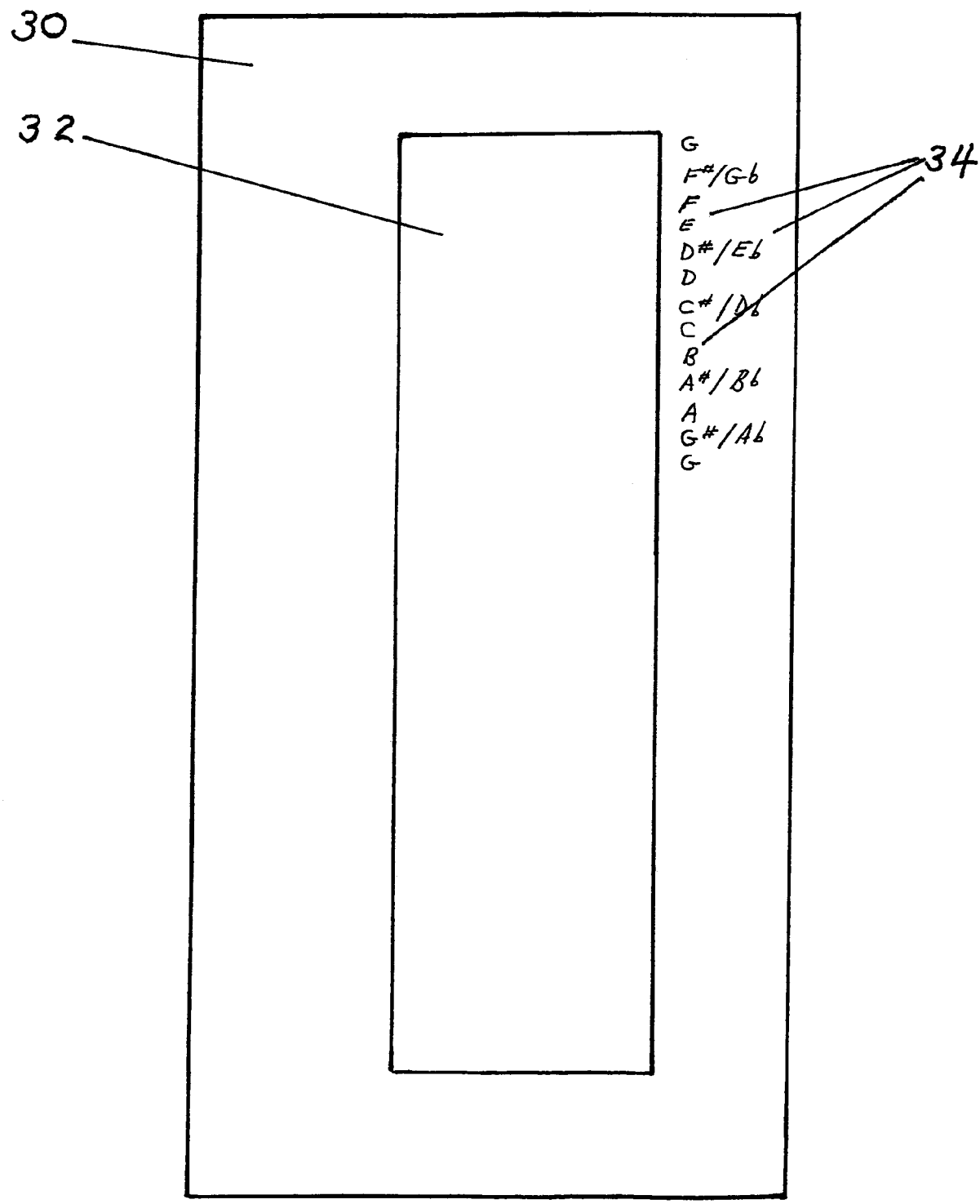
FIG. 3 is a front view of the frame 30, a rectangular piece with an aperture 32 for holding the guitar device window.
Figure 8:
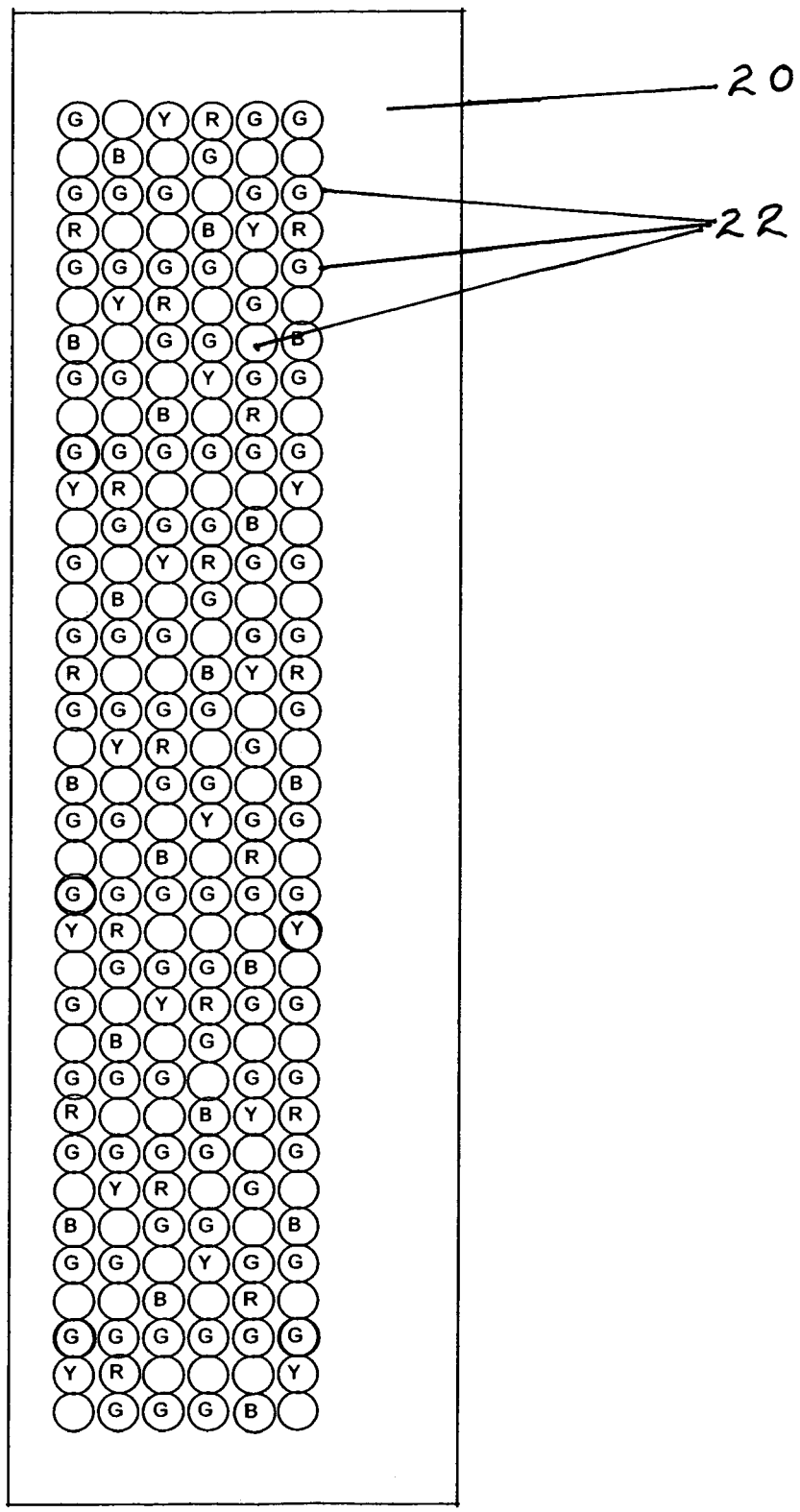

FIG. 8 is a computer-generated image of a proposed interchangeable window, to allow the display of a relative minor scale and chords. Labels were typed over the circles to indicate their color, those colors being: Transparent, (no label) Gray (G), Red (R), Blue (B) and Yellow (Y). Such a window, when substituted for the one already described in FIG. 2, would work with the other components to display relative minor scales.

Operation of the guitar device shown in FIGS. 1–5 is essentially the same as for all the multiple string devices I have made. The student locates the tonic note of the scale being studied on the vertical scale index 34 on the right hand side of the frame 30. He then moves the slide 14 until the indexing arrow 16 points to this note. When this is done, the note indicators 19 are aligned with the inked symbols 22 so the scale or key being studied is displayed with its associated fret numbers 18 and notes that are not in that scale are obscured. The notes comprising the tonic chord are highlighted by the colored symbols, so every possible major chord of that name (G major in this case) is instantly displayed, all the way up the entire instrument. Because the first, third, and fifth notes of the scale are identified by color, the student can apply some simple theory rules to modify the major chord, producing minors, dominant sevenths, augmented, diminished chords and others, without turning the pages in a chord diagram book looking for the desired form. Besides identifying tonic chords and scales, the device can also help the beginning student identify the other primary chords in a particular key, transpose a song from one key to another, and calculate where to put a capo on the instrument in order to move between keys more easily. This is true because these are all counting activities, and the device can be employed with some simple rules and methods to help simplify all these concerns.

The Violin or Fiddle device shown in FIG. 6A is operated in much the same way, with the exception that when the higher positions are studied, the narrow secondary slide 15, shown separately in FIG. 6B, is inserted. For example, consider moving to the violin third position. This means the hand slides up the neck until the first finger rests where the third finger normally is. Placing a violin "position" indicator 21 on the main slide in alignment with the corresponding violin "position" indicator on the secondary slide mimics that movement, and shows where the notes and chords are on the violin in the higher positions.

The Violin or Fiddle device shown in FIG. 7A demonstrates how the invention can be applied with the notes displayed in a single chromatic line, in this example displaying the key of A major. It also has an indexing system; in this case a bracket 26 on the frame 30 is aligned with a tonic note on the slide 14. The slide for this particular device is shown removed from the assembly in FIG. 7B. When properly aligned, the notes in the scale are displayed as with the other devices, and triad and primary chord information 27 is noted on the frame, although it could be done just as easily with different colors on the window as with the other devices. Furthermore, the note information 28 printed next to the note indicators 19 on the slide could just as easily be changed to produce a device for other instruments, or for vocalists, songwriters and arrangers.

There are several alternative ways these devices can be made, with respect to methods of construction, materials, layout and design.

Regarding construction methods, I have made all these devices by gluing the printed window into the frame, and then fastening the completed front to a back piece of the same materials and dimensions. Approximately ¾ inch wide by 10 inches long vertical spacers are sandwiched between the front and back, running along each edge parallel to the slide orientation. This creates a channel between the front and back parts to give the slide room to fit and operate. There is no reason this cannot be changed, such as by fastening the window into the frame first and then printing the whole assembly, or using an accordion-fold arrangement to produce a one-piece unit, eliminating the need for a separate back and spacers.

Materials changes might include using a one-piece plastic front if it could be made to have a transparent area for the window and an opaque printable area around it. Printable plastics could be used, as well as other materials, for all of the other parts as well. Design and layout changes might include using color in the window of the single-line chromatic tool instead of putting the chording information around the frame. One could also use other colors with either design to show the other primary chords of each key (the 4 and 5 chords), and/or the relative minor chord. The primary concern here is not to add so much information that the tool becomes confusing and difficult to use. The relative positions of the fixed and sliding parts might be reversed, so the note array is on a fixed transparent window with the colored scale position array sliding underneath. That would make it possible to put different scale patterns (major, minor, etc) on interchangeable slides and still use the same color scheme to highlight the chords, giving a way to represent almost any scale or mode without the complexity of devices described in the prior art. It is also possible to put a second aperture and a different scale type printed window in the back piece, print the slide on both sides and produce a "double-barreled" tool with major scales on one side and minors on the other. Finally, it is possible to avoid using a transparent window at all if the use of color is confined to the frame of the device. The effect of hiding the notes that are not in the key being examined could be achieved with cutouts or openings in an opaque paper material; available notes would be revealed through the openings and obscured elsewhere.

I claim:

1. A device for musical study, comprising:
   a. a fixed member and one or more moving members,
   b. one of said members, either moving or fixed, being printed with all the musical tones or notes available on an instrument being studied, and
   c. the other of said members containing a transparent window or aperture, printed with a series of geometric shapes, some transparent and others in different colors, in an array corresponding to the standard musical scale relationship of said tones, as arranged on said instrument, d. the two said members having means to make them capable of varying alignments whereby the user can display information critical to playing said instrument in a selected key, e. said colors being selected to differentiate the relative scale position of said notes or tones, with the first scale position having a first predetermined color, the third scale position having a second predetermined color, the fifth scale position having a third predetermined color, and those notes or tones which are not in the relevant key being partially obscured with a fourth predetermined color.

2. The device of claim 1, wherein the member containing the notes or tones is printed in a continuous chromatic sequence rather than an array matching the fingerboard of an instrument.

3. The device of claim 1, wherein said printed transparent window is replaced by two or more interchangeable windows, each one designed for a different type of musical scale.

4. The device of claim 1, wherein said printed transparent window is movable, so a given fingering position can be shown at varying locations on the instrument being studied.

* * * * *